US007521925B2

(12) United States Patent  (10) Patent No.: US 7,521,925 B2
Harder et al.  (45) Date of Patent: Apr. 21, 2009

(54) METHOD FOR DETERMINING THE ROTOR ANGULAR POSITION OF A ROTATING ELECTRICAL MACHINE

(75) Inventors: Thorsten Harder, Koblenz (CH); Dirk Beiser, Enneturgi (CH); Fabio Conticelli, Dättwil (CH); Patrick Bohren, Lenzburg (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 11/889,429

(22) Filed: Aug. 13, 2007

(65) Prior Publication Data

US 2008/0036408 A1   Feb. 14, 2008

(30) Foreign Application Priority Data

Aug. 14, 2006   (EP) .................................. 06405343

(51) Int. Cl.
     *G01B 7/30*  (2006.01)
(52) U.S. Cl. ............................................... 324/207.25
(58) Field of Classification Search ............ 324/207.11, 324/207.12, 207.15, 207.25, 160; 73/514.31, 73/514.39, 514.16; 318/254.1; 310/68 B
     See application file for complete search history.

(56) References Cited

U.S. PATENT DOCUMENTS 6,281,656 B1   8/2001   Masaki et al.
2002/0043953 A1   4/2002   Masaki et al.

OTHER PUBLICATIONS

European Search Report EP 06405343 (Jan. 31, 2007).

*Primary Examiner*—Reena Aurora
(74) *Attorney, Agent, or Firm*—Buchanan Ingersoll & Rooney PC

(57) ABSTRACT

A method is disclosed for determining the rotor angular position of a rotating electrical machine, which machine has a set of stator windings and a set of rotor windings, and in which method the set of stator windings is fed by an associated converter unit. First, the set of stator windings is then short-circuited at at least three predeterminable short-circuiting times by means of the converter unit within one revolution of the rotor given an assumed speed of the rotor. Then, the phase angle of the respective stator current is determined at each short-circuiting time, a differential phase angle being formed from phase angles determined at in each case two temporally adjacent short-circuiting times. Then, the minimum differential phase angle is determined from the differential phase angles, in the event of a negative minimum differential phase angle, a correction phase angle being added to the most recently determined phase angle, and, in the event of a positive minimum differential phase angle, the correction phase angle being subtracted from the most recently determined phase angle.

7 Claims, 1 Drawing Sheet

METHOD FOR DETERMINING THE ROTOR ANGULAR POSITION OF A ROTATING ELECTRICAL MACHINE

RELATED APPLICATIONS

This application claims priority under 35 U.S.C. §119 to EP Application 06405343.2 filed in Europe on Aug. 14, 2006, the entire contents of which are hereby incorporated by reference in their entireties.

TECHNICAL FIELD

The invention relates to the field of operating methods for rotating electrical machines. It is based on a method for determining the rotor angular position or for determining the magnetic flux angle of a rotating electrical machine.

BACKGROUND INFORMATION

A currently conventional rotating electrical machine has a set of stator windings and a set of rotor windings, the set of stator windings typically being fed by an associated converter unit. The rotor angular position of such a rotating electrical machine is nowadays primarily determined by a rotary encoder, which provides the desired rotor angular position, i.e. the angle of the rotor as it rotates, or the magnetic flux angle. Knowledge of the position of the rotor or the position of the magnetic flux vector is typically required for the regulation of the machine as one of currently a plurality of input variables. However, rotary encoders are very susceptible to mechanical load and, accordingly, often fail or produce faulty rotor angular position values. In addition, assembly is complex, since the rotary encoder itself and, in addition, the wiring need to be fitted to the machine, which is work-intensive and expensive. In addition, such a rotary encoder always requires maintenance, which means additional complexity.

SUMMARY

The object of the invention is therefore to specify a method for determining the rotor angular position of a rotating electrical machine which can be realized very easily and is robust and manages without rotary encoders.

In the method according to the invention for determining the rotor angular position of a rotating electrical machine, the machine has a set of stator windings and a set of rotor windings, the set of stator windings being fed by an associated converter unit. According to the invention, the set of stator windings is then short-circuited at at least three predeterminable short-circuiting times by means of the converter unit within one revolution of the rotor given an assumed speed of the rotor. The phase angle of the respective stator current is determined at each short-circuiting time. Furthermore, a differential phase angle is formed from phase angles determined at in each case two temporally adjacent short-circuiting times, and the minimum differential phase angle is determined from the differential phase angles. In the event of a negative minimum differential phase angle, a correction phase angle is added to the most recently determined phase angle, and, in the event of a positive minimum differential phase angle, the correction phase angle is subtracted from the most recently determined phase angle. The result after the addition of the correction phase angle or after the subtraction of the correction phase angle is then the rotor angular position required. The determination of the rotor angular position of a rotating electrical machine in accordance with the method according to the invention is therefore advantageously possible without rotary encoders with all of their disadvantages, with the result that, overall, a method for determining the rotor angular position of a rotating electrical machine which is robust and is very simple to realize is achieved. These and further objects, advantages and features of the present invention are rendered obvious in the detailed description below of preferred embodiments of the invention in conjunction with the drawing.

BRIEF DESCRIPTION OF THE DRAWINGS

In the drawings.

In principle, identical parts in the figure are provided with the same reference symbols.

DETAILED DESCRIPTION

Figure 1:
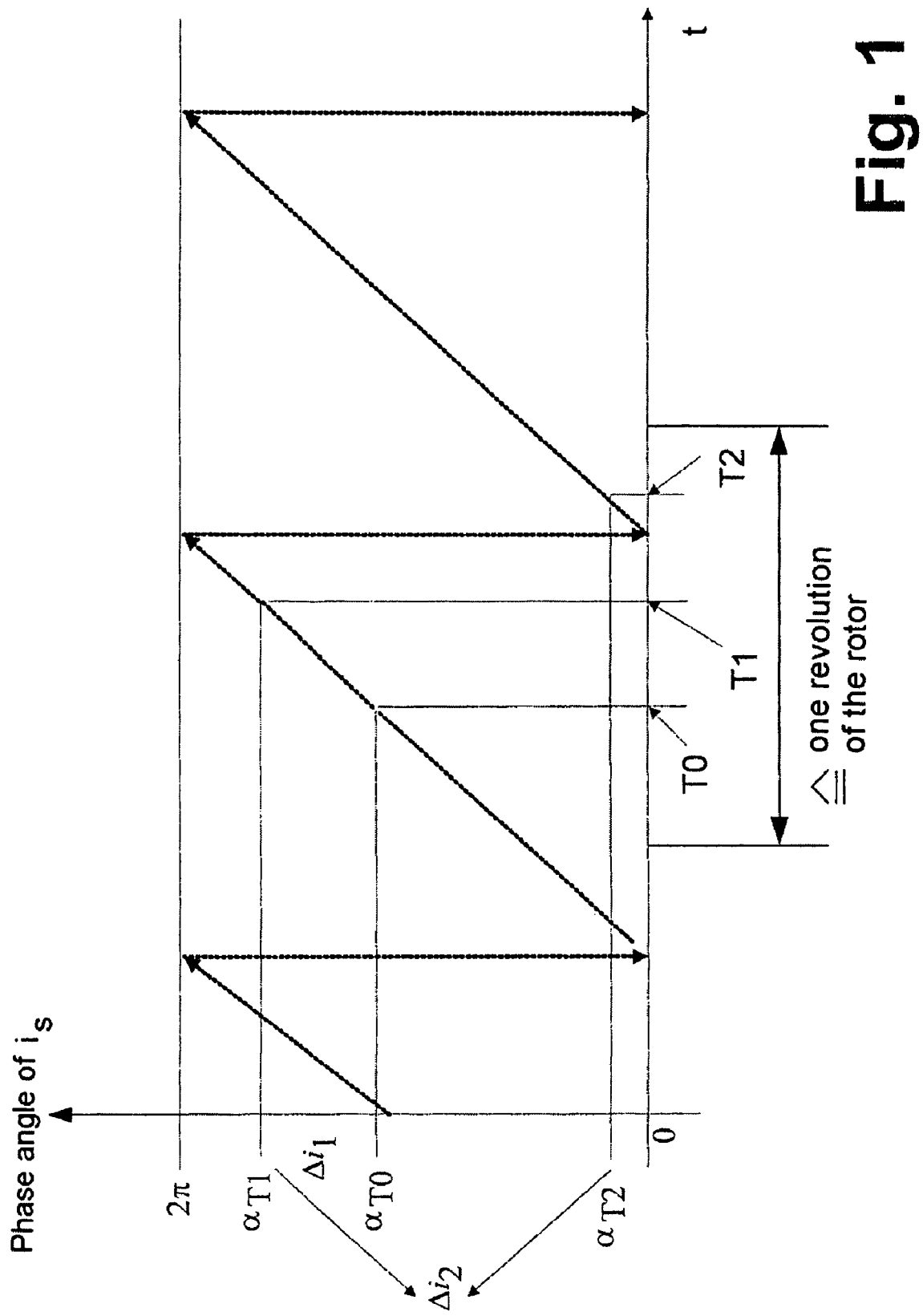
FIG. 1 shows the time profile of the phase angle of the stator current of the rotating electrical machine in the method according to the invention.

FIG. 1 illustrates a time profile of the phase angle of the stator current of the rotating electrical machine which occurs in the method according to the invention. The profile of the phase angle of the stator current, as shown in FIG. 1, runs from 0 to $2\pi$, then starts again at 0 and again runs up to $2\pi$, and so on. The machine has a set of stator windings and a set of rotor windings, the set of stator windings, in accordance with the method, being fed by an associated converter unit. The rotating electrical machine is typically in the form of a synchronous machine or an asynchronous machine.

In the method according to the invention, the set of stator windings is now short-circuited at at least three predeterminable short-circuiting times T0, T1, T2 by means of the converter unit within one revolution of the rotor given an assumed speed of the rotor. FIG. 1 illustrates, by way of example, a time interval which corresponds to one revolution of the rotor given an assumed speed of the rotor. Within this revolution, the set of stator windings is then short-circuited at the at least three predeterminable short-circuiting times T0, T1, T2 by means of the converter unit. As shown in FIG. 1, the phase angle $\alpha_{T0}$, $\alpha_{T1}$, $\alpha_{T2}$ of the respective stator current $i_{ST0}$, $i_{ST1}$, $i_{ST2}$ is determined at each short-circuiting time T0, T1, T2. The respective stator current $i_{ST0}$, $i_{ST1}$, $i_{ST2}$ is preferably determined in particular by means of measurement, for example via current sensors, the amplitude $1_{ST0}$, $1_{ST1}$, $1_{ST2}$ of the respective stator current $i_{ST0}$, $i_{ST1}$, $i_{ST2}$ and the phase angle $\alpha_{T0}$, $\alpha_{T1}$, $\alpha_{T2}$ of the respective stator current $i_{ST0}$, $i_{ST1}$, $i_{ST2}$ being determined. A differential phase angle $\Delta i_1$, $\Delta i_2$ is formed from phase angles $\alpha_{T0}$, $\alpha_{T1}$, $\alpha_{T2}$ determined at in each case two temporally adjacent short-circuiting times T0, T1, T2. The associated formulae given assumed three phase angles $\alpha_{T0}$, $\alpha_{T1}$, $\alpha_{T2}$ within one revolution of the rotor are as follows:

$$\Delta i_1 = \alpha_{T1} - \alpha_{T0}$$

$$\Delta i_2 = \alpha_{T2} - \alpha_{T1}.$$

In addition, the minimum differential phase angle $\Delta i_{min}$ is then determined, in particular by means of simple value comparison, from the differential phase angles $\Delta i_1$, $\Delta i_2$. In the event of a negative minimum differential phase angle $\Delta i_{min}$, a correction phase angle $\Delta i_c$ is added to the most recently determined phase angle $\alpha_{T2}$, and, in the event of a positive minimum differential phase angle $\Delta i_{min}$, the correction phase angle $\Delta i_c$ is subtracted from the most recently determined phase angle $\alpha_{T2}$. The correction phase angle $\Delta i_c$ is preferably $\pi/2$. In this case, use is made of the fact that the stator current of the rotating electrical machine generally lags the magnetic stator flux of the rotating electrical machine by $\pi/2$ and that the direction, i.e. the angle, of the vector of the magnetic stator flux in the event of no load on the rotating electrical machine corresponds to the rotor angular position (in the case of a synchronous machine) or the position of the magnetic flux vector (in the case of an asynchronous machine). The result after the abovementioned addition of the correction phase angle $\Delta i_c$ to the most recently determined phase angle $\alpha_{T2}$ or after the subtraction of the correction phase angle $\Delta i_c$ from the most recently determined phase angle $\alpha_{T2}$ is then the rotor angular position required. Whether a negative minimum differential phase angle $\Delta i_{min}$ results and, accordingly, a correction phase angle $\Delta i_c$ is added or whether a positive minimum differential phase angle $\Delta i_{min}$ results and, accordingly, a correction phase angle $\Delta i_c$ is subtracted depends on the direction of rotation of the rotor. The determination of the rotor angular position of the rotating electrical machine in accordance with the method according to the invention is accordingly advantageously possible without rotary encoders with all of their disadvantages, with the result that, overall, a method for determining the rotor angular position of a rotating electrical machine which is robust and very simple to realize is achieved. It has been shown to be advantageous that the short-circuiting times T0, T1, T2 are equidistant within one revolution of the rotor given the assumed speed of the rotor.

As has already been mentioned above, the amplitude $1_{ST0}$, $1_{ST1}$, $1_{ST2}$ of the respective stator current $i_{ST0}$, $i_{ST1}$, $i_{ST2}$ is determined at each short-circuiting time T0, T1, T2. Each determined amplitude $1_{ST0}$, $1_{ST1}$, $1_{ST2}$ is monitored within a predeterminable monitoring time period for an adjustable amplitude threshold value. Furthermore, a total phase difference angle $\Delta i$ is formed from the determined phase angles $\alpha_{T0}$, $\alpha_{T1}$, $\alpha_{T2}$ within one revolution of the rotor, in particular by forming the difference between the determined phase angles $\alpha_{T0}$, $\alpha_{T1}$, $\alpha_{T2}$. The total phase difference angle $\Delta i$ is then monitored for an adjustable total phase difference angle threshold value. If the machine is actually rotating more slowly than the assumed speed, this is indicated by the adjustable amplitude threshold value being undershot or by the adjustable total phase difference angle threshold value being undershot.

Therefore, the assumed speed of the rotor is advantageously reduced in the event of the adjustable amplitude threshold value being undershot or in the event of the adjustable total phase difference angle threshold value being undershot. The rotor angular position can then be determined correctly and clearly again in accordance with the abovementioned steps by means of the reduction in the assumed speed of the rotor.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for determining the rotor angular position of a rotating electrical machine, which machine has a set of stator windings and a set of rotor windings,
   in which method the set of stator windings is fed by an associated converter unit,
   wherein a set of stator windings is short-circuited at at least three predeterminable short-circuiting times by means of the converter unit within one revolution of the rotor given an assumed speed of the rotor,
   wherein a phase angle of the respective stator current is determined at each short-circuiting time,
   wherein a differential phase angle is formed from phase angles determined at in each case two temporally adjacent short-circuiting times,
   wherein a minimum differential phase angle is determined from the differential phase angles, and
   wherein, in an event of a negative minimum differential phase angle, a correction phase angle is added to a most recently determined phase angle, and, in an event of a positive minimum differential phase angle, the correction phase angle is subtracted from the most recently determined phase angle.

2. The method as claimed in claim 1, wherein the correction phase angle is $\pi/2$.

3. The method as claimed in claim 2, wherein the short-circuiting times are equidistant within one revolution of the rotor given the assumed speed of the rotor.

4. The method as claimed in claim 2, wherein the amplitude of the respective stator current is determined at each short-circuiting time,
   wherein each determined amplitude is monitored within a predeterminable monitoring time period for an adjustable amplitude threshold value,
   wherein a total phase difference angle is formed from the determined phase angles within one revolution of the rotor,
   wherein the total phase difference angle is monitored for an adjustable total phase difference angle threshold value,
   wherein, in the event of the adjustable amplitude threshold value being undershot or in the event of the adjustable total phase difference angle threshold value being undershot, the assumed speed of the rotor is reduced.

5. The method as claimed in claim 1, wherein the short-circuiting times are equidistant within one revolution of the rotor given the assumed speed of the rotor.

6. The method as claimed in claim 5, wherein the amplitude of the respective stator current is determined at each short-circuiting time,
   wherein each determined amplitude is monitored within a predeterminable monitoring time period for an adjustable amplitude threshold value,
   wherein a total phase difference angle is formed from the determined phase angles within one revolution of the rotor,
   wherein the total phase difference angle is monitored for an adjustable total phase difference angle threshold value,
   wherein, in the event of the adjustable amplitude threshold value being undershot or in the event of the adjustable total phase difference angle threshold value being undershot, the assumed speed of the rotor is reduced.

7. The method as claimed in claim 1, wherein the amplitude of the respective stator current is determined at each short-circuiting time,
   wherein each determined amplitude is monitored within a predeterminable monitoring time period for an adjustable amplitude threshold value,
   wherein a total phase difference angle is formed from the determined phase angles within one revolution of the rotor,
   wherein the total phase difference angle is monitored for an adjustable total phase difference angle threshold value,
   wherein, in the event of the adjustable amplitude threshold value being undershot or in the event of the adjustable total phase difference angle threshold value being undershot, the assumed speed of the rotor is reduced.

* * * * *